United States Patent Office 3,324,133
Patented June 6, 1967

3,324,133
2-NITROGEN 6-METHYL AND 1,6-DIMETHYL-ERGOLINE DERIVATIVES
Federico Arcamone and Giovanni Franceschi, Milan, and Alfredo Glaesser, Rome, Italy, assignors to Società Farmaceutici Italia, Milan, Italy, an Italian corporation
No Drawing. Filed Apr. 13, 1965, Ser. No. 447,913
Claims priority, application Italy, Apr. 14, 1964,
8,131/64
16 Claims. (Cl. 260—285.5)

Our invention relates to 2-substituted 6-methyl and 1,6-dimethyl-ergoline derivatives and to a process for preparing them.

The invention provides the new compounds, 6-methyl- and 1,6-dimethyl-ergolines of the formula:

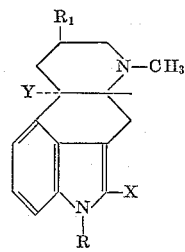

wherein
R is selected from the group consisting of hydrogen and methyl,
$R_1$ is selected from the group consisting of —COOH, —CO—NH—R′,

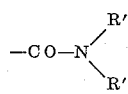

—CO—NH—R″, —CH$_2$—OR‴, and
—CH$_2$—NHR‴

X is selected from the group consisting of —NO$_2$, —NH$_2$, and —NH—R‴,
R′ is selected from the group consisting of hydrogen, alkyl, hydroxyalkyl, etherified alkyl and etherified hydroxyalkyl having from 1 to 4 carobn atoms.
R″ is the heterocyclic residue of the ergot alkaloids,
R‴ is an acyl radical of an acid selected from the group consisting of aliphatic, cycloaliphatic, aromatic and heterocyclic carboxylic acids of from 1 to 10 carbon atoms, and
Y is selected from the group consisting of hydrogen, —OH, and —OCH$_3$.

According to the literature, there are only a few compounds having a substituent in 2-position of an ergoline ring system: namely the 2-halo-ergolines (H. Troxler et al., Helv. Chim. Acta, 1957, 40, page 2160) and the 2,X-dibromo-ergolines (Belgian Patent No. 626,370) which show oxytocic activity.

We have discovered a method for inserting a nitrogroup into the 2-position of ergoline derivatives and have found surprisingly that the resulting 2-nitro-ergoline derivatives show an interesting hypotensive and spasmolytic activity. The invention includes the reduction of the 2-nitro-ergolines to the corresponding 2-aminoergolines, which may be isolated as such or acylated with the anhydride or the chloride of a carboxylic acid corresponding to R‴ as defined above, optionally in the presence of a tertiary amine, such as dimethylaniline, pyridine or analogues. The resulting 2-amine- and the 2-acylamino ergolines have also been found to display interesting pharmacological properties: they have shown an oxytocic, antienteraminic, adrenolytic, hypotensive and sedative activity. Thus the invention includes pharmaceutical compositions containing at least one compound according to the invention in admixture with a therapeutically acceptable diluent or carrier.

The 6-methyl- and 1,6-dimethyl-ergolines, substituted in the 8-position, which are the starting materials for the process of the invention, may have the D- or the L- or the racemic configuration, and are known for example from U.S. patent applications No. 190,229 now abandoned; No. 285,230, now Patent No. 3,228,944; No. 285,229, now Patent No. 3,228,943; No. 296,930, now Patent No. 3,236,852; and No. 295,289, abandoned in favor of Serial No. 406,190 which is now Patent No. 2,372,823.

The nitration according to the invention is carried out at between —30° C. and room temperature and tends to go rather quickly, but is preferably carried out during from 1 to 5 hours. The reaction is performed in the presence of a lower aliphatic carboxylic acid either alone or in admixture with its anhydride, preferably in the presence of acetic acid and acetic anhydride. For the nitration the usal nitrating agents known in organic chemistry, preferably concentrated nitric acid, may be employed. The amount of nitric acid to be used in the reaction depends on the amount of the ergoline starting material. This may vary from 2 to 5 equivalents per equivalent of ergoline starting material and is preferably 3. When the reaction is over, the nitro-product obtained is isolated and purified either by crystallization or by chromatography through a column of alumina. 2-nitro-ergolines are characterized by their ultraviolet absorption spectrum which shows a λ maximum in the area around 250 m$\mu$ and another around 350 m$\mu$.

The 2-nitro-ergolines are then reduced to the corresponding 2-amino-ergolines in the presence of a hydrogenation catalyst such as platinum dioxide or palladium on charcoal at room temperature and under atmospheric pressure in an organic solvent, preferably acetic acid. The final product is isolated as such or transformed into an acyl derivative by reaction with the anhydride or chloride of a carboxylic acid corresponding to R‴ as defined above.

The following examples serve to illustrate the invention without limiting it.

*Example 1.—2-nitro-dihydro-D-lysergic acid*

1 cc. of nitric acid (1.52 density) is added to a solution of 2 g. of dihydro-D-lysergic acid in 20 cc. of acetic anhydride, cooled to —30° C. The reaction mixture is stirred for two hours at —10° C., and for three hours at 0° C., and poured into five volumes of diethyl ether. An amorphous yellow product is obtained, which is dissolved in dilute aqueous ammonia. From this solution, on adding dilute acetic acid, crude 2-nitro-dihydro-D-lysergic acid precipitates and is recrystallized from water in the presence of charcoal. Yellow crystals melting at 210° C. with decomposition are obtained. The U.V. absorption spectrum (alcohol solution) shows two $\lambda_{max}$, respectively at 250 and 355 m$\mu$.

*Example 2.—2-nitro-dihydro-D-lysergamide*

2.5 cc. of nitric acid (density 1.52), 0.1 g. urea, 3.5 cc. glacial acetic acid are added to a solution of 5 g. dihydro-D-lysergamide I in 50 cc. of acetic anhydride, cooled to —30° C. The nitration reaction mixture is stirred for two hours at —10° C. and for three hours at 0° C., and finally poured into five volumes of diethyl ether. A yellow precipitate separates, which is suspended in 200 cc. of water and made alkaline by adding sodium bicarbonate. The solid product is filtered off, dried and taken up several times with 500 cc. of boiling ethanol. The insoluble residue is discarded. The solution is completely evaporated and the residue is taken up with five portions of 150 cc. of boiling chloroform. The insoluble residue is discarded and the chloroform solution is concentrated and chromatographed over 50 g. of aluminum oxide and then eluted with chloroform containing 2% of ethanol. Evaporation of the eluate yields 2-nitro-dihydro-D-lysergamide, melting at 212° C. with decomposition. The U.V. absorption spectrum shows two $\lambda_{max}$ respectively at 249 ($\epsilon=9950$) and 355 m$\mu$ ($\epsilon=16400$).

*Example 3.—1-methyl-2-nitro-dihydro-D-lysergamide*

To a solution of 2.0 g. of 1-methyl-dihydro-D-lysergamide in 20 cc. of acetic anhydride and 2 cc. of glacial acetic acid cooled to 0° C., the following nitration mixture was slowly added with stirring: 0.8 cc. of nitric acid (density 1.52), 9 cc. of acetic anhydride, 1 cc. of acetic acid. The nitration is effected in the dark and in a nitrogen stream, the addition is completed in nearly an hour and the resulting dark-red solution is poured into 5 volumes of cold diethyl ether. The yellow precipitate is filtered and dissolved in 50 cc. of distilled water. The solution is made alkaline with sodium bicarbonate and extracted several times with chloroform until colored extracts are obtained. The extracts are combined and concentrated. The solution is then chromatographed through a column containing 50 g. of Brockman's alumina and eluted with chloroform containing 1% of ethyl alcohol. The collected eluate fractions on distillation yield 1-methyl-2-nitro-dihydro-D-lysergamide, melting at 250° C. with decomposition, whose U.V. absorption spectrum shows two $\lambda_{max}$ respectively at 252 and 355 m$\mu$; $[\alpha]_D^{20}=313°$ (c.=0.11 in dimethylformamide).

*Example 4.—1-methyl-2-nitro-dihydro-D-lysergamide*

0.9 cc. of nitric acid (density 1.52) and 10 cc. of acetic acid are added, at between 10 and 18° C., to a solution of 2 g. of 1-methyl-dihydro-D-lysergamide in 20 cc. of glacial acetic acid. The addition takes nearly an hour and from then on the process is continued as in Example 3. The resulting products and their yields are as in Example 3.

*Example 5.—2-nitro-dihydro-D-lysergic acid N,N-diethylamide*

To a solution of 10 g. of dihydro-D-lysergic acid diethylamide in 100 cc. of acetic anhydride, the following mixture is slowly added with stirring at a temperature of 2–5° C: 3.5 cc. of nitric acid (density 1.52) and 40 cc. of acetic anhydride. After nearly an hour, the addition is completed and the red-brown solution thus obtained is poured into 5 volumes of ethyl ether. The precipitate is filtered off and dissolved in water. The solution so obtained is made alkaline by adding sodium bicarbonate, and extracted with chloroform until the color in the chlorofrom extracts disappears. The chloroform extracts are combined, evaporated and the residue recrystallized from aqueous ethanol. 2-nitro-dihydro-D-lysergic dihydrate acid diethylamide, melting at about 120° C., is obtained; $[\alpha]_D^{20}=-176°$ (c.=0.116 in methanol). The U.V. absorption spectrum shows two $\lambda_{max}$ at 252 and 356 m$\mu$.

*Example 6.—2-nitro-6-methyl-8-acetylamino-methyl-ergoline*

To a solution of 2 g. 6-methyl-8-acetylamino-methyl-ergoline (synonym N-acetyl-dihydro-lysergamine) in 20 cc. of acetic anhydride and 4 cc. of glacial acetic acid the following mixture was slowly added at 0° C.: 1 cc. of nitric acid (density 1.52) and 8 cc. of acetic anhydride. The addition takes an hour and then the reaction mixture is poured into cold diethyl ether and the precipitate is filtered and dissolved in water. The solution is made alkaline as above and extracted with chloroform. The chloroform extracts are concentrated and chromatographed through a column of aluminum oxide and eluted with chloroform containing 1% of ethanol. After separating the fractions, which show the two characteristic $\lambda_{max}$ in the U.V. absorption spectrum, and evaporating to dryness, a residue is obtained which on recrystallization from acetone yields 2-nitro-6-methyl-8-acetylamino-methyl-ergoline, melting at 270° C. (with decomposition); $[\alpha]_D^{20}=-240°$ (c.=0.105 in dimethylformamide). The product shows the two $\lambda_{max}$ in the U.V. absorption spectrum at 245 and 353 m$\mu$.

*Example 7.—2-nitro-dihydro-ergotamine*

A mixture of 0.13 cc. of concentrated nitric acid (density 1.52) in 2 cc. of acetic anhydride is added with stirring to a solution, cooled to 0° C., of 0.600 g. of dihydro-ergotamine in 5 cc. of acetic anhydride and 1 cc. of glacial acetic acid. The reaction mixture is stirred for an hour and a half and then poured into cold diethyl ether. The yellow precipitate obtained is dissolved in water and the aqueous solution is made alkaline by adding sodium bicarbonate and then extracted with chloroform. The chloroform solution is concentrated to one third of its original volume and chromatographed through a column of aluminum oxide using as eluant chloroform containing 0.5% of ethanol. From the fractions, which show in the U.V. absorption spectrum the characteristic $\lambda_{max}$ at 250 and 354 m$\mu$, 2-nitro-dihydro-ergotamine is obtained which upon recrystallization from aqueous ethanol melts at 210–212° C. (with decomposition).

*Example 8.—1-methyl-2-nitro-dihydro-D-lysergol nicotinate*

A mixture of 0.5 cc. of fuming nitric acid and 4 cc. of acetic anhydride is slowly added to a solution of 1 g. of 1-methyl-dihydrolysergol nicotinate in 10 cc. of acetic anhydride and 2 cc. of acetic acid cooled at 0° C. After an hour and a half, the reaction mixture is poured into cold diethyl ether and the precipitate obtained is filtered and dissolved in water. The solution is made alkaline with sodium carbonate and extracted with chloroform. Operating as in Example 7, 1-methyl-2-nitro-dihydro-D-lysergol nicotinate, which melts at 175° C. (with decomposition), and shows in the U.V. absorption spectrum the $\lambda_{max}$ at 253 and 351 m$\mu$, is obtained.

*Example 9.—2-nitro-dihydro-D-lysergic acid α-oxyethylamide*

To a solution of 1 g. of dihydro-D-lysergic acid α-oxyethylamide (obtained by catalytic reduction of the natural alkaloid D-lysergic acid α-oxyethylamide in 15 cc. of acetic anhydride) and 10 cc. of glacial acetic acid cooled to 0° C., the following mixture is added during 15 minutes: 1.5 cc. of glacial acetic acid; 0.4 cc. of nitric acid with a density of 1.52; 0.050 g. of urea and 5 cc. of acetic anhydride. When the addition is over, the reaction mixture is stirred for a further 45 minutes and then poured into five volumes of diethyl ether. The resulting precipitate is dissolved in 100 cc. of water and the solution is made alkaline by adding sodium bicarbonate and extracted with ethyl acetate. The combined extracts are evaporated in vacuo to dryness and the residue is submitted to countercurrent distribution by Craig's method, using the two-phase methanol-chloroform-water-carbon tetrachloride (3:2:2:1) system. 40 transfers are effected (volume of each phase in each tube 25 cc.) and the contents of tubes 16 to 21 are removed and evaporated in vacuo to dryness. By recrystallization of the residue from ethanol, 2-nitro-dihydro-D-lysergic acid α-oxyethylamide, melting at 250–260° C. (with decomposition), is obtained whose U.V. absorption spectrum shows two $\lambda_{max}$ at 250 and 355 m$\mu$.

*Example 10.—2-amino-dihydro-D-lysergic acid N,N-diethylamide*

0.200 g. of 2-nitro-dihydro-D-lysergic acid N,N-diethylamide I in 5 cc. of glacial acetic acid are hydrogenated in the presence of 30 mg. of platinum dioxide at room temperature and atmospheric pressure. The theoretical absorption is reached in 30 minutes. The catalyst is filtered off in the absence of oxygen, 0.5 cc. of sulfuric acid in 8 cc. of water are added and the solution is lyophilized, 2-amino-dihydro-D-lysergic acid diethylamide sulfate is obtained in form of a white powder, melting at 230° C. (with decomposition) whose U.V. absorption spectrum shows a $\lambda_{max}$ at 281 m$\mu$.

*Example 11.—2-acetamido-dihydro-D-lysergic acid N,N-diethylamide*

0.200 g. of 2-nitro-dihydro-D-lysergic acid N,N-diethylamide are hydrogenated as in Example 10. 5 cc. of acetic anhydride are added to the amine solution, in the absence of oxygen, and the mixture is allowed to stand for 48 hours. The catalyst is separated by filtration, the solvent is evaporated, the residue is taken up with 2 cc. of water. The solution is then made alkaline by adding sodium bicarbonate and extracted with chloroform. The extract is evaporated and the residue crystallized from aqueous ethanol. Finally 2-acetylamino-dihydro-D-lysergic acid N,N-diethylamide, melting at 273–275° C., is obtained. The product shows in the U.V. absorption spectrum two $\lambda_{max}$ at 290 and 300 m$\mu$.

*Example 12.—2-carboethoxyamino-dihydro-D-lysergic acid N,N-diethylamide*

0.100 g. of 2-nitro-dihydro-D-lysergic acid diethylamide in 6 cc. of glacial acetic acid are hydrogenated at atmospheric pressure and room temperature in the presence of 25 mg. of platinum dioxide. After an hour the theoretical absorption is reached. 1.1 cc. of ethyl chloroformate is then added and the mixture is allowed to stand for 48 hours. The catalyst is separated by filtration, and the mixture is poured into ice-water, made alkaline by adding sodium bicarbonate and extracted with chloroform. The chloroform extracts are evaporated in vacuo to dryness and the residue is dissolved in benzene. Addition of cyclohexane precipitates a white powder of 2-carboethoxyamino-dihydro-D-lysergic acid N,N-diethylamide which is soluble in lower alcohols, chloroform, acetone and benzene. Its U.V. absorption spectrum in solution in ethyl alcohol shows a $\lambda_{max}$ at 286 m$\mu$.

*Example 13.—2-nitro-lumilysergol-8-nicotinate-10-methylether*

Operating as in Example 8 but using lumilysergol-8-nicotinate-10-methylester as the starting material, 2-nitro-lumilysergol-8-nicotinate-10-methylether is obtained.

We claim:

1. A process for preparing a compound of the formula:

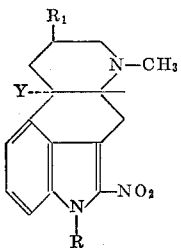

wherein
R is selected from the group consisting of hydrogen and methyl,
$R_1$ is selected from the group consisting of —COOH, —CO—NH—R',

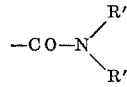

—CO—NH—R'', —CH$_2$—OR''', and
—CH$_2$—NHR'''

R' is selected from the group consisting of hydrogen, ethyl, hydroxyethyl, and etherified hydroxyethyl, R'' is the heterocyclic residue of the ergot amine,
R''' is an acyl radical of an acid selected from the group consisting of aliphatic having 1 to 4 carbon atoms, and nicotinic acid, and
Y is selected from the group consisting of hydrogen and —OH, which comprises reacting a compound of the formula

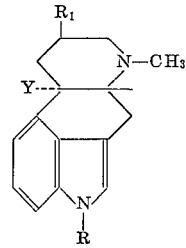

wherein R, Y, and $R_1$ have the above meaning, dissolved in a lower aliphatic acid, with nitric acid at a temperature between —30° C. and room temperature and isolating the 2-nitro-derivative so obtained.

2. A process according to claim 1 wherein the nitration is performed in acetic acid and acetic anhydride.

3. A process according to claim 1 wherein the 2-nitro-derivative is hydrogenated in the presence of platinum dioxide at room temperature and atmospheric pressure to the corresponding 2-amino derivative and isolating the same.

4. The process of claim 3 wherein the 2-amino-derivative is converted into its acyl derivative by an acylating agent of an acid selected from the group consisting of aliphatic having 1 to 4 carbon atoms, and nicotinic acid.

5. A compound of 6-methyl- and 1,6-dimethyl-ergoline of the formula

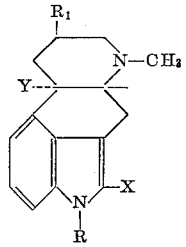

wherein
R is selected from the group consisting of hydrogen and methyl,
$R_1$ is selected from the group consisting of —COOH, —CO—NH—R',

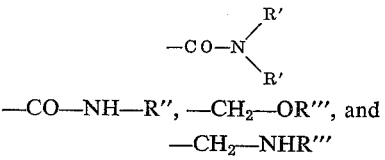

—CO—NH—R'', —CH$_2$—OR''', and
—CH$_2$—NHR'''

X is selected from the group consisting of —NO$_2$, —NH$_2$, and —NH—R''',
R' is selected from the group consisting of hydrogen, ethyl, hydroxyethyl, and etherified hydroxyethyl,
R'' is the heterocyclic residue of the ergot amine,
R''' is an acyl radical of an acid selected from the group consisting of aliphatic, containing 1 to 4 carbon atoms, and nicotinic acid, and
Y is selected from the group consisting of hydrogen and —OH.

6. 2-nitro-dihydro-D-lysergic acid.
7. 2-nitro-dihydro-D-lysergamide.
8. 1-methyl-2-nitro-dihydro-D-lysergamide.
9. 2-nitro-dihydro-D-lysergic acid N,N-diethylamide.
10. 2-nitro-6-methyl-8-acetylaminomethyl-ergoline.
11. 2-nitro-dihydro-ergotamine.
12. 1-methyl-2-nitro-dihydro-D-lysergol nicotinate.

13. 2-nitro-dihydro - D - lysergic acid α-hydroxy-ethylamide.
14. 2-amino-dihydro-D-lysergic acid N,N-diethylamide.
15. 2-acetylamino-dihydro-D-lysergic acid N,N-diethylamide.
16. 2-carboethxy-dihydro-D-lysergic acid N,N-diethylamide.

References Cited

Burger, Medicinal Chemistry, 2nd ed., Inter-Science, pp. 585–586 and 622 (1960).

Stoll, Chem. Rev., vol. 47, pp. 214–5 (1950).

ALEX MAZEL, *Primary Examiner.*

DONALD G. DAUS, *Assistant Examiner.*